United States Patent
Eriksson et al.

(10) Patent No.: US 9,420,390 B2
(45) Date of Patent: Aug. 16, 2016

(54) ESTIMATION AND SUPPRESSION OF HARMONIC LOUDSPEAKER NONLINEARITIES

(75) Inventors: Anders Eriksson, Uppsala (SE); Per Åhgren, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 13/980,525

(22) PCT Filed: Feb. 3, 2011

(86) PCT No.: PCT/SE2011/050119
§ 371 (c)(1),
(2), (4) Date: Jul. 18, 2013

(87) PCT Pub. No.: WO2012/105880
PCT Pub. Date: Aug. 9, 2012

(65) Prior Publication Data
US 2013/0287216 A1    Oct. 31, 2013

(51) Int. Cl.
*G10L 21/02* (2013.01)
*G10L 21/0208* (2013.01)
(Continued)

(52) U.S. Cl.
CPC .............. *H04R 29/001* (2013.01); *G10L 21/02* (2013.01); *H04M 9/082* (2013.01); *G10L 2021/02082* (2013.01); *H04B 3/237* (2013.01)

(58) Field of Classification Search
CPC ................ G10L 21/02; G10L 2021/02082; H04R 29/001; H04M 9/082; H04B 3/237
USPC ................. 381/56, 59, 66, 93, 94.1–94.3; 704/225–227; 379/406.01–406.16
See application file for complete search history.

(56) References Cited

U.S. PATENT DOCUMENTS 6,842,516 B1    1/2005    Armbruster
8,433,074 B2 *  4/2013    Hoshuyama ............. 379/406.01
(Continued)

FOREIGN PATENT DOCUMENTS

EP    1672803 A2    6/2006
EP    1672803 A3    6/2007
(Continued)

OTHER PUBLICATIONS

Extended European Search Report, PCT/SE2011/050119, mailed Jun. 25, 2014.
(Continued)

*Primary Examiner* — David Ton
(74) *Attorney, Agent, or Firm* — Myers Bigel & Sibley, P.A.

(57) ABSTRACT

A harmonic echo power estimator estimates power of echo generated by harmonic loudspeaker nonlinearities in a user equipment having an echo path between a loudspeaker input and a microphone output. The estimator includes a frequency band mapper that maps each frequency band in a set of loudspeaker output signal frequency bands into a corresponding array of loudspeaker input signal frequency bands, where each frequency band in the set is mapped into several frequency bands in the corresponding array. A power estimator determines a power estimate of each input signal in each array of frequency bands. A power estimate combiner combines determined power estimates in each array of frequency bands into a corresponding estimate of loudspeaker input power generating harmonic loudspeaker nonlinearities. A power estimate transformer transforms the estimates of loudspeaker input power across the echo path into power estimates of the echo generated by the harmonic loudspeaker nonlinearities.

17 Claims, 9 Drawing Sheets

(51) Int. Cl.
  *H04R 29/00* (2006.01)
  *H04M 9/08* (2006.01)
  *H04B 3/23* (2006.01)

(56) References Cited

U.S. PATENT DOCUMENTS

| | | | |
|---|---|---|---|
| 8,462,958 B2* | 6/2013 | Kuech | 379/406.01 |
| 8,634,569 B2* | 1/2014 | Lu | H04M 9/082 |
| | | | 381/66 |
| 2006/0188089 A1 | 8/2006 | Diethorn et al. | |
| 2007/0041575 A1* | 2/2007 | Alves | H04M 9/082 |
| | | | 379/406.08 |
| 2009/0214048 A1* | 8/2009 | Stokes, III | H04M 9/082 |
| | | | 381/66 |
| 2009/0310796 A1 | 12/2009 | Seydoux | |
| 2010/0017205 A1 | 1/2010 | Visser et al. | |

FOREIGN PATENT DOCUMENTS

| | | |
|---|---|---|
| EP | 1 978 649 A2 | 10/2008 |
| EP | 1672803 B1 | 4/2011 |
| JP | 2003284183 A | 10/2003 |
| WO | WO 86/03912 A1 | 7/1986 |
| WO | WO 03/010950 A1 | 2/2003 |
| WO | WO 2007021722 A2 | 2/2007 |
| WO | WO 2009095161 A1 | 8/2009 |

OTHER PUBLICATIONS

Written Opinion of the International Searching Authority, PCT/SE2011/050119, Nov. 29, 2011.

International Preliminary Report on Patentability, PCT/SE2011/050119, Aug. 6, 2013.

A. Stenger et al.: "Adaptive volterra filters for nonlinear acoustic echo cancellation"; University of Erlangen-Nürnberg, Telecommunications Laboratory; Cauerstr. 7, D-91058 Erlangen, Germany.

G. Budura et al.: "Nonlinearities Identification using The LMS Volterra Filter" Faculty of Electronics and Telecommunications, Timisoara, Bd. V. Parvan, No. 2; Romania; http://www.utt.ro/english/index.php; 6 pages.

H. Schurer et al.: "Second Order Volterra Inverses for Compensation of Loudspeaker Nonlinearity"; University of Twente, Dept. of Electrical Eng., Laboratory for Network Theory and VLSI Design, Enschede, The Netherlands; 4 pages.

Dai et al.: "Compensation of Loudspeaker Nonlinearity in Acoustic Echo Cancellation Using Raised-Cosine Function"; 1057-7130; IEEE Transactions on Circuits and Systems—II: Express Briefs, vol. 53, No. 11, Nov. 2006; pp. 1190-1194.

International Search Report, PCT/SE2011/050119, Nov. 29, 2011.

* cited by examiner

ESTIMATION AND SUPPRESSION OF HARMONIC LOUDSPEAKER NONLINEARITIES

CROSS REFERENCE TO RELATED APPLICATION

This application is a 35 U.S.C. §371 national stage application of PCT International Application No. PCT/SE2011/050119, filed on 3 Feb. 2011, the disclosure and content of which is incorporated by reference herein in its entirety. The above-referenced PCT International Application was published in the English language as International Publication No. WO 2012/105880 A1 on 9 Aug. 2012.

TECHNICAL FIELD

The present invention relates to echo cancellation in user equipment for communication systems, and in particular to estimation and suppression of harmonic loudspeaker nonlinearities generated in such equipment.

BACKGROUND

An echo subtractor is one of the key components of an echo canceller. It also distinguishes it from a pure echo suppressor, that only attenuates the signal when echo is present. The main benefit of an echo canceller is improved performance in situations with simultaneous speech from both ends in the communication (so called double-talk) and also an increased transparency to low-level near-end sound, which increases the naturalness of the conversation.

Echo subtraction is usually implemented using a linear model, primarily because a linear model is computationally simple to estimate, but also because it is much harder to find an appropriate nonlinear model that works in general. For these reasons the echo subtraction generally cannot remove nonlinear echoes originating from nonlinearities in the echo path.

Another key component in an echo canceller is a residual echo suppressor, which reduces any residual echoes present in the output from the echo subtractor to such a level that the requirements on echo attenuation imposed by the relevant standards are fulfilled, and to such a level that the residual echo is not noticeable in the presence of the near-end signal. However, since the suppression performed by the residual echo suppressor also affects the desired near-end signal if the frequency content of the near-end signal and the residual echo are overlapping, the suppression performed by the residual echo suppressor should be as small as possible, as the transparency loss (of the near-end signal) introduced by this component is directly related to the amount of suppression performed.

Harmonic overtones in the loudspeaker output caused by nonlinearities will be picked up by the microphone as nonlinear echoes. These echoes also need to be removed by the echo canceller. However, as the echo subtractor is based on a linear model of the echo path, the echo subtractor cannot reduce the nonlinear echoes. These must therefore be removed by the residual echo suppressor. In order to do this the residual echo suppressor needs an estimate of the power of the nonlinear echoes. Furthermore, this estimate has to be accurate, since otherwise the residual echo suppressor needs to perform extra suppression (plan for a worst case scenario) in order to compensate for the uncertainty in the nonlinear echo power estimate. This will then result in reduced echo canceller transparency of the near-end signal, which is undesirable.

One class of methods [1-4] of modeling harmonic loudspeaker nonlinearities is based on a Volterra model using powers of the loudspeaker input signal. This is, however, computationally very complex. Furthermore, the harmonics produced by the Volterra model are typically aliased, so an up/down-sampling scheme is needed to avoid the aliasing to affect the power estimate of the harmonic loudspeaker nonlinearities, which makes the Volterra-based solution even more complex.

SUMMARY

An object of the present invention is computationally simple estimation of echo power originating from harmonic loudspeaker nonlinearities.

Another object of the present invention is suppression of echo power originating from harmonic loudspeaker nonlinearities.

These objects are achieved in accordance with the attached claims.

According to a first aspect the present invention involves a method of estimating power of echo generated by harmonic loudspeaker nonlinearities in a user equipment having an echo path between a loudspeaker input and a microphone output. This method includes the following steps: Each frequency band in a set of loudspeaker output signal frequency bands is mapped into a corresponding array of loudspeaker input signal frequency bands, each frequency band in the set being mapped into several frequency bands in the corresponding array. A power estimate is determined for each loudspeaker input signal in each array of frequency bands. Determined power estimates in each array of frequency bands are combined into a corresponding estimate of loudspeaker input power generating harmonic loudspeaker nonlinearities. The estimates of loudspeaker input power are transformed across the echo path into power estimates of the echo generated by the harmonic loudspeaker nonlinearities.

According to a second aspect the present invention involves an echo suppression method using a frequency selective filter based on the ratio between a power estimate of a near-end signal and a power estimate of an echo signal. This method includes the following steps: A power estimate of a residual echo signal from an echo subtractor is determined. A power estimate of echo generated by harmonic loudspeaker nonlinearities is determined in accordance with the first aspect. The power estimate of the echo signal is formed by adding the power estimate of the residual echo signal to the power estimate of echo generated by harmonic loudspeaker nonlinearities.

According to a third aspect the present invention involves a harmonic echo power estimator configured to estimate power of echo generated by harmonic loudspeaker nonlinearities in a user equipment having an echo path between a loudspeaker input and a microphone output. The harmonic echo power estimator includes the following elements: A frequency band mapper configured to map each frequency band in a set of loudspeaker output signal frequency bands into a corresponding array of loudspeaker input signal frequency bands, each frequency band in the set being mapped into several frequency bands in the corresponding array. A power estimator configured to determine a power estimate of each loudspeaker input signal in each array of frequency bands. A power estimate combiner configured to combine determined power estimates in each array of frequency bands into a corresponding estimate of loudspeaker input power generating harmonic loudspeaker nonlinearities. A power estimate transformer configured to transform the estimates of loudspeaker input power across the echo path into power estimates of the echo generated by the harmonic loudspeaker nonlinearities.

According to a fourth aspect the present invention involves an echo canceller having a residual echo suppressor using a frequency selective filter based on the ratio between a power estimate of a near-end signal and a power estimate of an echo signal. The echo canceller includes the following elements: A power estimator configured to determine a power estimate of a residual echo signal from an echo subtractor. A harmonic echo power estimator in accordance with the third aspect configured to determine a power estimate of echo generated by harmonic loudspeaker nonlinearities. An adder configured to add the power estimate of the residual echo signal to the power estimate of echo generated by harmonic loudspeaker nonlinearities.

According to a fifth aspect the present invention involves a user equipment including an echo canceller in accordance with the fourth aspect.

An advantage of the present invention is that it provides computationally simple estimation of echo power originating from harmonic loudspeaker nonlinearities using a limited number of parameters.

Another advantage of the present invention is that it fits seamlessly into banding schemes normally used in a residual echo suppressor, which typically is the component in an echo canceller where the nonlinear echo power estimate is used.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
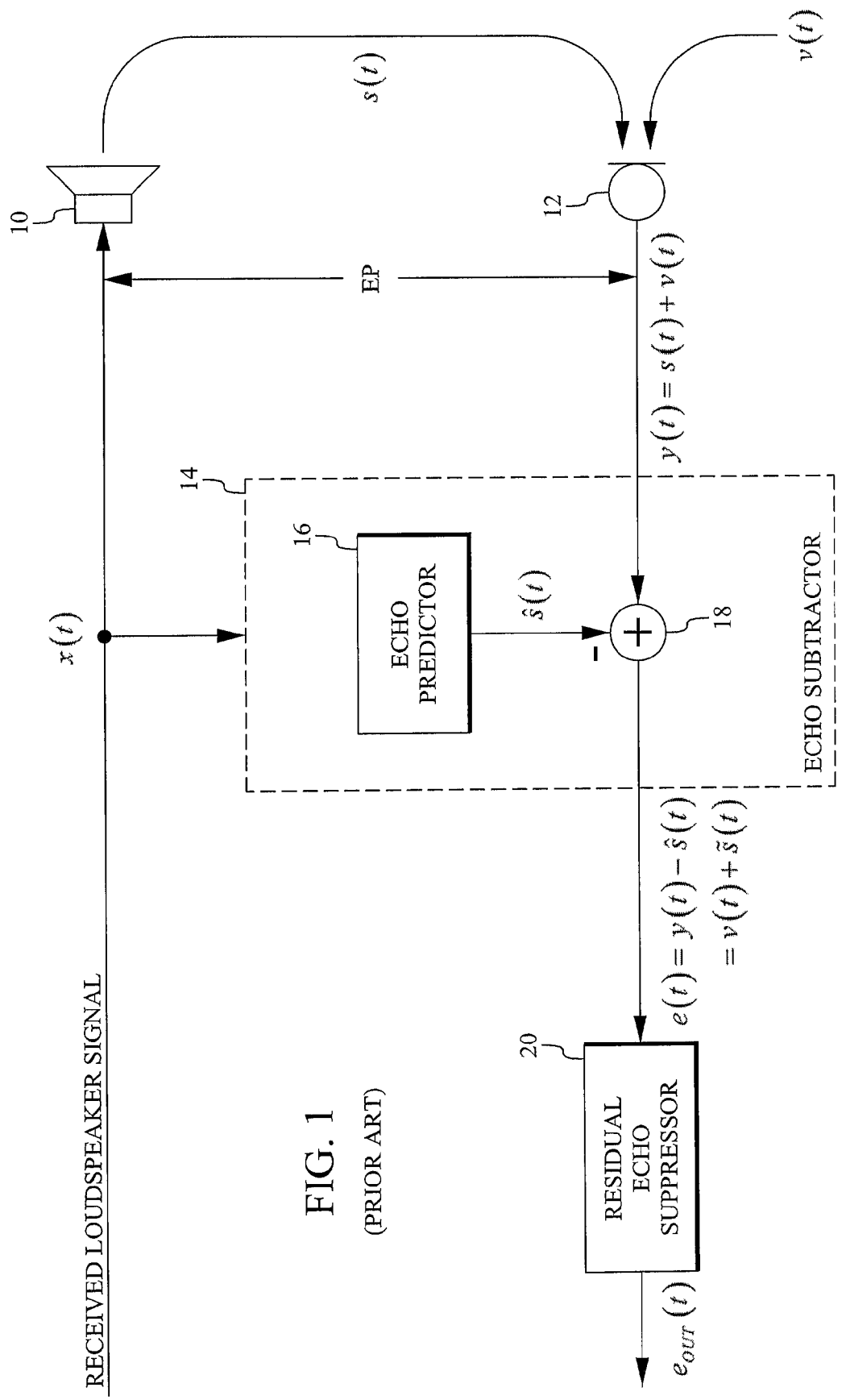
FIG. 1 is a block diagram illustrating the general principles of a conventional echo canceller.

FIG. 1 is a block diagram illustrating the general principles of a conventional echo canceller. The received signal x(t) is passed to a loudspeaker 10 and forms an undesired echo signal s(t) at a microphone 12. This echo is picked up by the microphone together with a desired near-end signal v(t) as the microphone signal y(t). An echo path EP is formed between the loudspeaker input and microphone output. An echo subtractor 14 uses an adaptive model to form an estimate ŝ(t) of the echo signal s(t) in an echo predictor 16. The echo in the microphone signal y(t) is then reduced by subtracting ŝ(t) from y(t) in an adder 18. Finally, any residual echoes s̃(t) present in the output e(t) from the echo canceller are suppressed by a residual echo suppressor 20, thereby producing the final output signal $e_{OUT}(t)$ from the echo canceller.

The residual echo suppressor 20 is typically implemented so that the residual echoes in e(t) are suppressed using a frequency selective filter. The characteristics of the frequency response G(t, f) of the frequency selective filter applied by the residual echo suppressor 20 depends on the estimated spectral characteristics $\hat{P}_v(t, f)$ of v(t) and $\hat{P}_{\tilde{s}}(t, f)$ of s̃(t). Typically, if for a certain frequency f' we have that $\hat{P}_v(t, f') \gg \hat{P}_{\tilde{s}}(t, f')$, i.e. the near-end signal is much stronger than the residual echo signal, then G(t, f') would be close to 1 (almost no attenuation). On the other hand, should we have that $\hat{P}_v(t, f') \approx \hat{P}_{\tilde{s}}(t, f')$, i.e. the near-end signal is approximately equal to the residual echo signal, then G(t, f') would typically be chosen to be small (significant attenuation).

Figure 2A:
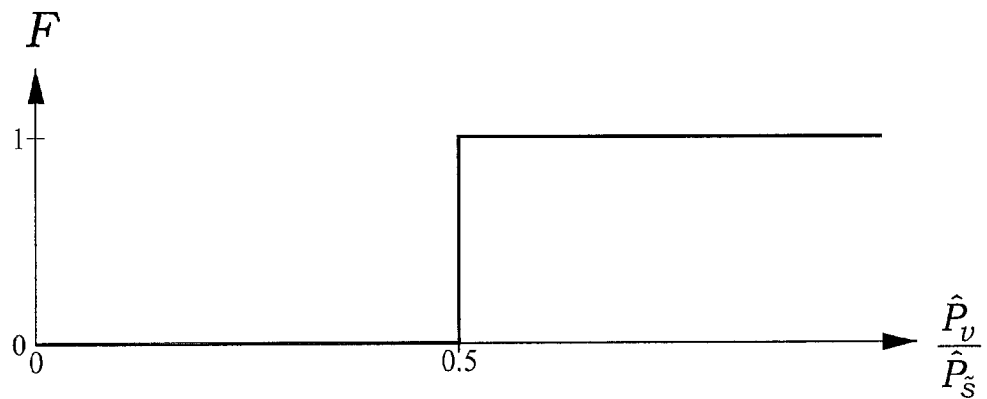
FIG. 2A-B is a diagram illustrating typical frequency responses of the frequency selective filter applied to the residual echo from an echo subtractor.
Figure 2B:
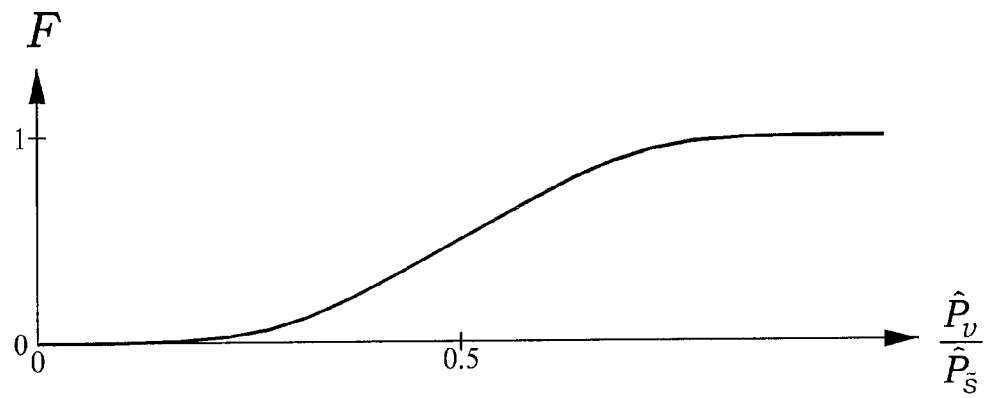

Generally it is desired to have a smooth continuous behavior of G(t, f) from passing through the signal to significantly suppressing the signal. Such behavior will eliminate distortions caused by discontinuities in G(t, f) over time. Typically this is achieved by making G(t, f) proportional to the ratio between $\hat{P}_{\tilde{s}}(t, f)$ and $\hat{P}_v(t, f)$:

$$G(t, f) = F\left(\frac{\hat{P}_v(t, f)}{\hat{P}_{\tilde{s}}(t, f)}\right) \quad (1)$$

where F is an implementation dependent function. FIG. 2A-B illustrates examples of the function F representing the frequency response G(t, f) of the frequency selective filter applied by the residual echo suppressor 20. Clearly the shape of the function illustrated in FIG. 2B is preferable from a smoothness point of view.

Since divisions are computationally complex to perform, in many real-time echo canceller realizations the computation of G(t, f) is typically performed over frequency bands to minimize the number of divisions needed to compute G(t, f). If a uniform bandwidth B is used for the banding, G(t, f) may then be approximated as:

$$G(t, f) \approx G(t, b) = F\left(\frac{\hat{P}_v(t, b)}{\hat{P}_{\tilde{s}}(t, b)}\right), \quad b = \text{floor}\{f/B\} \quad (2)$$

Thus, G(t, f) is approximated by a piecewise constant function G(t, b).

A typical banding scheme would be to uniformly use B=250 Hz for a frequency range of 0-4000 Hz. To simplify the discussion herein, this banding scheme will generally be assumed, but the present invention is by no means restricted to this particular banding scheme. Thus, B may be larger or smaller than the given example. Another possibility is to let B vary over the frequency range. As an example, B could be smaller in the middle of the diagram in FIG. 2B than near the endpoints to account for the rapid variation of F in that region.

Figure 3:
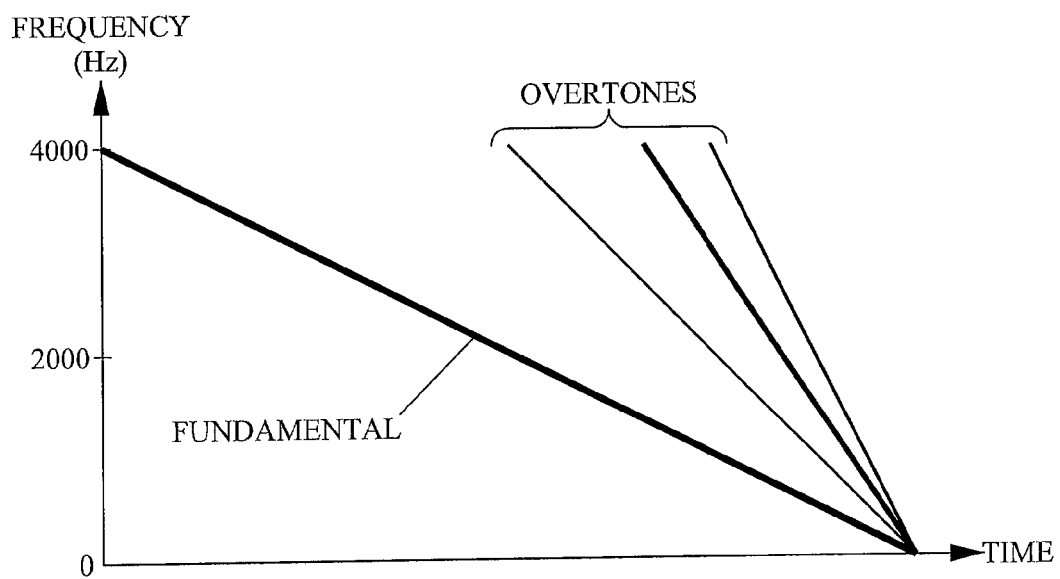
FIG. 3 is a diagram illustrating the phenomenon of harmonic loudspeaker nonlinearities.

A common type of nonlinearity in loudspeakers generates harmonic overtones in the loudspeaker output. FIG. 3 is a diagram illustrating the phenomenon of such harmonic loudspeaker nonlinearities in a UE. The diagram shows a (sinusoidal) fundamental varying in frequency from 4000 Hz to 0 Hz over the given time period. For such a sinusoidal loudspeaker input the loudspeaker output contains harmonic overtones at 2,3,4, . . . times the fundamental frequency. These overtones are generated in a nonlinear manner since the loudspeaker input does not contain any (or very low) power at those frequencies. The power of the different tones has been illustrated by the thickness of the lines in FIG. 3. Thus, in the example the second overtone is stronger than the first and third overtones, but weaker than the fundamental tone.

A feasible method to compute the harmonics in the loudspeaker output could be based on the harmonics in the loudspeaker input. Solutions based on such an approach would, however, require a full spectral estimate of the loudspeaker input to estimate the nonlinear loudspeaker output, thereby making the method computationally complex.

Referring once more to FIG. 1, the harmonic overtones in the loudspeaker output s(t) will be picked up by the microphone 12 as nonlinear echoes. These echoes need to be removed by the echo canceller. However, since the echo subtractor 14 is based on a linear model of the echo path EP, the echo subtractor cannot reduce the nonlinear echoes. These must therefore be removed by the residual echo suppressor 20. In order to do this, the residual echo suppressor needs an estimate of the power of the nonlinear echoes. Furthermore, the estimate of the power of the nonlinear echoes needs to be accurate, since otherwise the residual echo suppressor needs to perform extra suppression in order to compensate for the uncertainty in the nonlinear echo power estimate. This will result in reduced echo canceller transparency of the near-end signal v(t), which is undesirable.

Figure 4:
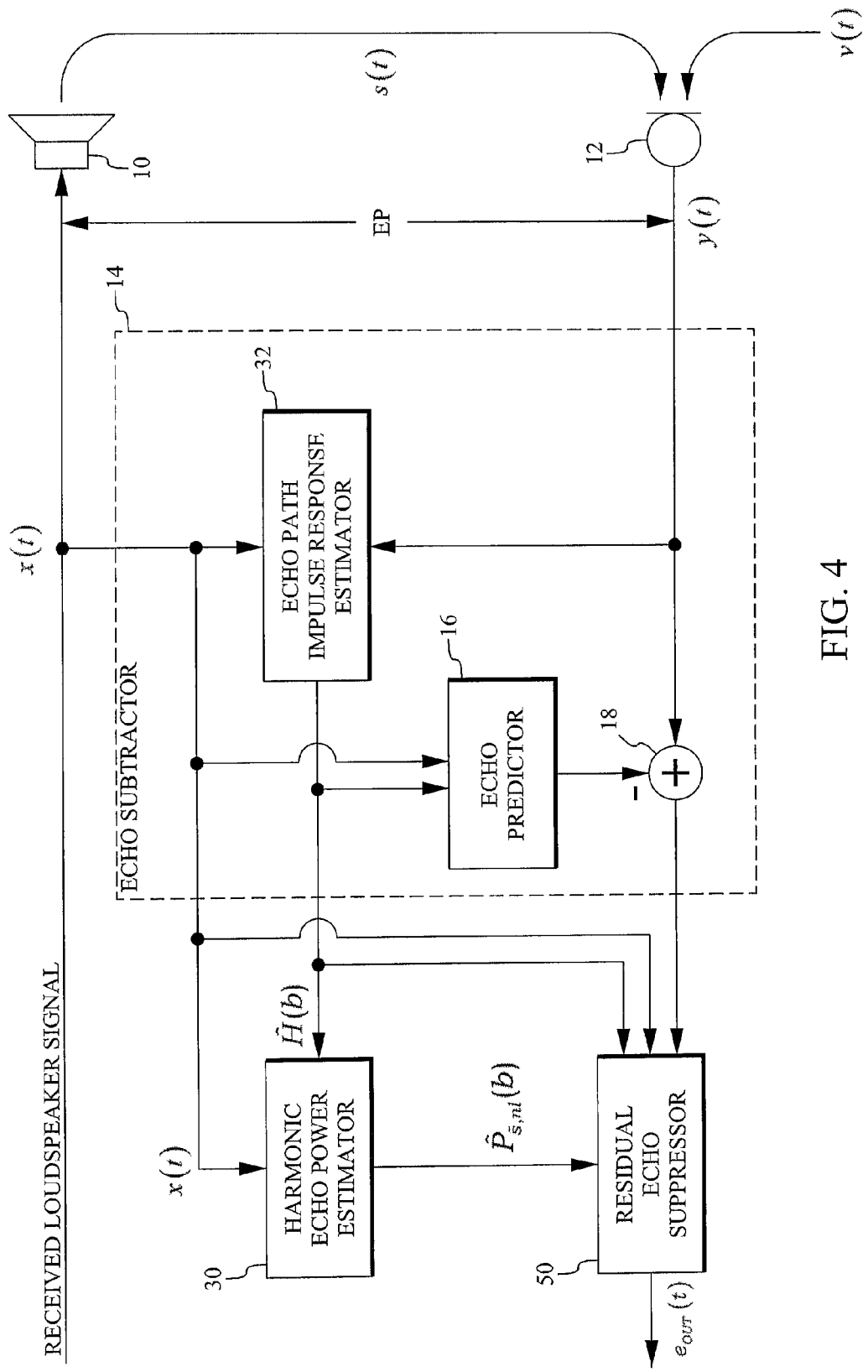
FIG. 4 is a block diagram illustrating an embodiment of an echo canceller in accordance with the present invention.

FIG. 4 is a block diagram illustrating an embodiment of an echo canceller in accordance with the present invention. The echo canceller includes a residual echo suppressor 50 using a frequency selective filter, such as G(t,b) described above, based on the ratio between a power estimate of a near-end signal and a power estimate of the echo signal. The difference is that now the power estimate of the echo signal also must include a power estimate of echo generated by harmonic loudspeaker nonlinearities in addition to the linear echo power estimate. Thus, the frequency selective filter G(t, b) is represented as:

$$G(t,b) = F\left(\frac{\hat{P}_v(t,b)}{\hat{P}_{\tilde{s},l}(t,b) + \hat{P}_{\tilde{s},nl}(t,b)}\right) \quad (3)$$

where $\hat{P}_v(t, b)$ represents the power estimate of the near end signal, $\hat{P}_{\tilde{s},l}(t,b)$ represents the linear echo power estimate (represented as $\hat{P}_{\tilde{s},l}(t,b)$ in equation (2)), i.e. a power estimate of the residual echo signal from echo subtractor 14, and $\hat{P}_{\tilde{s},nl}(t, b)$ represents the power estimate of echo generated by harmonic loudspeaker nonlinearities.

Returning to FIG. 4, the echo canceller therefore further includes a harmonic echo power estimator 30 configured to determine the power estimate $\hat{P}_{\tilde{s},nl}(b)$ of echo generated by harmonic loudspeaker nonlinearities. From now on the time dependence on power estimates will be dropped to avoid cluttering of the equations. However, it should be remembered that power estimates in equations given below depend on time as well as frequency band b.

From the above it is clear that an important aspect of the invention is estimation of the power $\hat{P}_{\tilde{s},nl}(b)$ of the nonlinear echo in the microphone signal caused by the harmonic loudspeaker nonlinearity. The estimation is performed in the harmonic echo power estimator 30 in banded manner, preferably matched to the banding structure of the residual echo suppressor.

Figure 5:
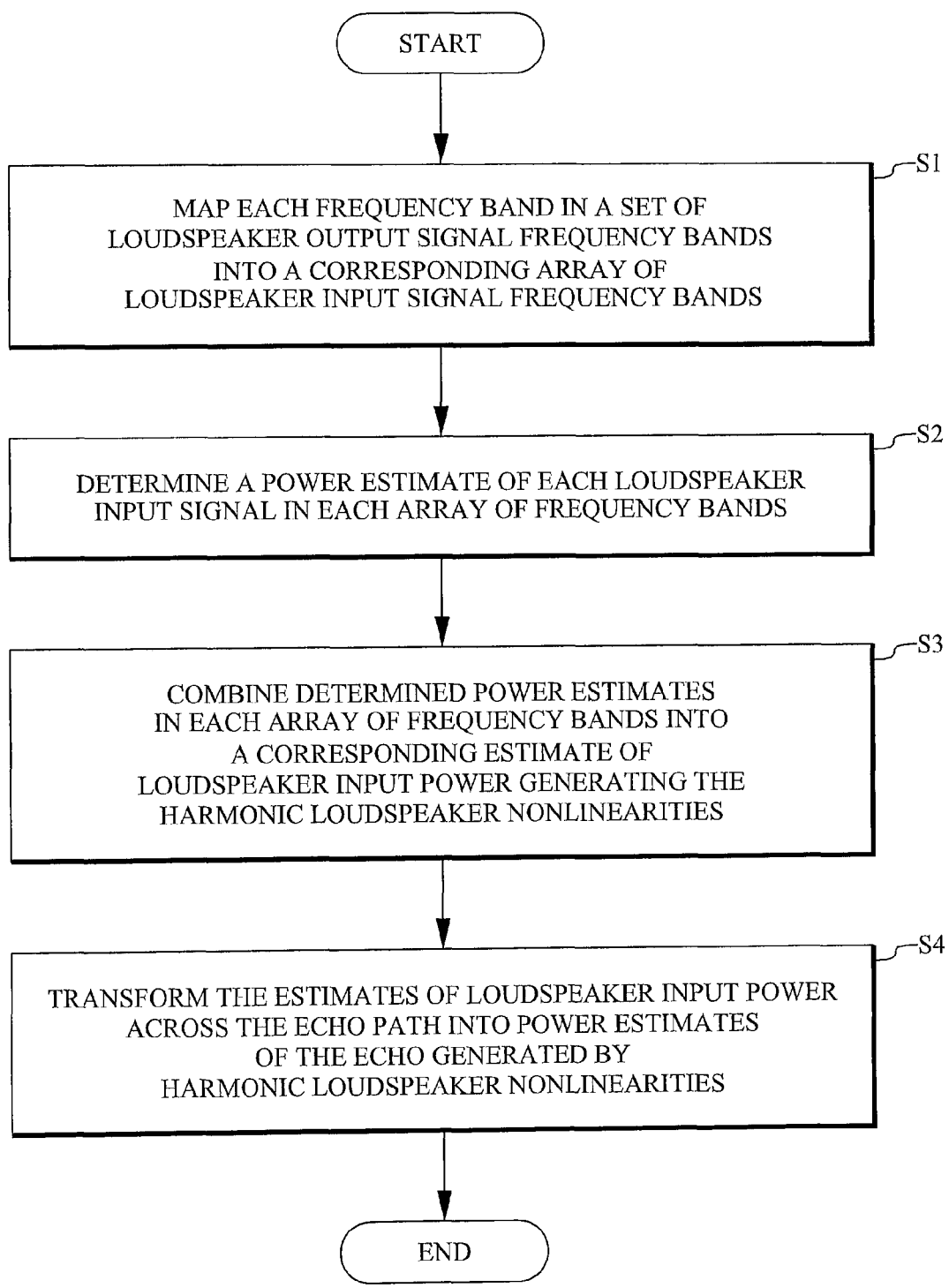
FIG. 5 is a flow chart illustrating an embodiment of a method of estimating power of echo generated by harmonic loudspeaker nonlinearities in accordance with the present invention.

FIG. 5 is a flow chart illustrating an embodiment of a method of estimating power of echo generated by harmonic loudspeaker nonlinearities in accordance with the present invention. The harmonic echo power estimator 30 is configured to implement this functionality.

Step S1 maps each frequency band in a set of loudspeaker output signal frequency bands $b_{lsp}$ into a corresponding array of loudspeaker input signal frequency bands b ($b_{lsp}$, k), where each frequency band in the set is mapped into several frequency bands in the corresponding array. The purpose of this step is to determine which bands in the input signal x(t) that actually can produce an overtone in loudspeaker output band $b_{lsp}$. Here k=1,2,3, . . . denotes the overtone number. An example of this mapping (and how it may be realized) is given in Table 1 in APPENDIX 1. From this table it can be seen that a loudspeaker output band $b_{lsp}$ may include overtones generated by several input signal bands (several k). Thus, typically the mapping is "one-to-many" bands, especially for the higher bands $b_{lsp}$. On the other hand, for lower bands many frequency bands in the corresponding array may actually be the same band.

Step S2 determines a power estimate $\hat{P}_x(b(b_{lsp},k))$ of each loudspeaker input signal in each array of frequency bands. Thus, this step determines a power estimate of each input signal in bands that can generate an overtone in loudspeaker output band $b_{lsp}$.

Step S3 combines determined power estimates $\hat{P}_x(b(b_{lsp}, k))$ in each array of frequency bands into a corresponding estimate $\hat{P}_{x,nl}(b_{lsp})$ of loudspeaker input power generating harmonic loudspeaker nonlinearities. Thus, this step determines a total power estimate of input signal components that generate overtones in loudspeaker output band $b_{lsp}$.

In a preferred embodiment the combining step S3 may be based on the combination:

$$\hat{P}_{x,nl}(b_{lsp}) = \sum_{k=1}^{N_O} C(b_{lsp}, k) \cdot \hat{P}_x(b(b_{lsp}, k)) \quad (4)$$

where $\hat{P}_{x,nl}(b_{lsp})$ denotes the estimate of loudspeaker input power in loudspeaker output signal frequency band $b_{lsp}$, $b(b_{lsp}, k)$ denotes the mapping (further described in APPENDIX 1), $\hat{P}_x(b(b_{lsp}, k))$ denotes determined power estimates in loudspeaker input signal frequency bands $b(b_{lsp}, k)$, $C(b_{lsp}, k)$ denotes predetermined coefficients (further described in APPENDIX 2), $N_O$ denotes a maximum number of terms to be included in each combination.

The maximum number of terms $N_O$ corresponds to the maximum number of overtones to be considered, for example $N_O$ lies in the interval 3-9. It has been found that $N_O=6$ gives reasonable complexity and storage requirements and seems to be sufficient for most loudspeakers exhibiting harmonic nonlinearities. Thus, relatively few coefficients are needed to specify the behavior, while still retaining a good control of the loudspeaker model. The actual values for the coefficients are different for different types of loudspeakers. Typically, the actual values are determined from spectrogram estimates of loudspeaker inputs and outputs, where the input consists of a sweeping sinusoid.

In one embodiment only determined power estimates $\hat{P}_x(b(b_{lsp},k))$ exceeding a predetermined power threshold are combined. This power threshold represents a minimum level below which spectral components do not generate nonlinear harmonics. This embodiment also implies a further complexity reduction. The threshold can be found by frequency sweeping sinusoids of different levels and observing at what level the nonlinearities cease to occur.

In another embodiment only terms $C(b_{lsp}, k) \cdot \hat{P}_x(b(b_{lsp},k))$ exceeding another predetermined threshold are included in the sum. In this embodiment the determined power estimates weighted by the coefficients $C(b_{lsp},k)$ are compared to the threshold, which means that only the most important terms in the sum are retained.

Step S4 transforms the estimates $\hat{P}_{x,nl}(b_{lsp})$ of loudspeaker input power across the echo path EP into power estimates $\hat{P}_{\tilde{s},nl}(b)$ of the echo generated by the harmonic loudspeaker nonlinearities. The transformation may be performed by multiplying the estimates of loudspeaker input power with the squared magnitude of an estimate $\hat{H}(b)$ of the frequency response of the echo path EP in accordance with:

$$\hat{P}_{\tilde{s},nl}(b) = |\hat{H}(b)|^2 \hat{P}_{x,nl}(b), b=1, \ldots, N_{BANDS} \quad (5)$$

where $N_{BANDS}$ is the number of frequency bands. In an echo canceller $\hat{H}(b)$ is typically known from an adaptive filter in the echo path impulse response estimator 32 of echo subtractor 14. If no estimate of $\hat{H}(b)$ is available, it can readily be estimated from the frequency characteristics of the loudspeaker input and microphone output signals.

Returning to FIG. 4, in the illustrated embodiment the harmonic echo power estimator 30 uses the loudspeaker input signal x(t) and the estimate $\hat{H}(b)$ from the echo subtractor 14 to produce the power estimate $\hat{P}_{\tilde{s},nl}(b)$ of the nonlinear echo, as will now be described with reference to FIG. 6.

Figure 6:
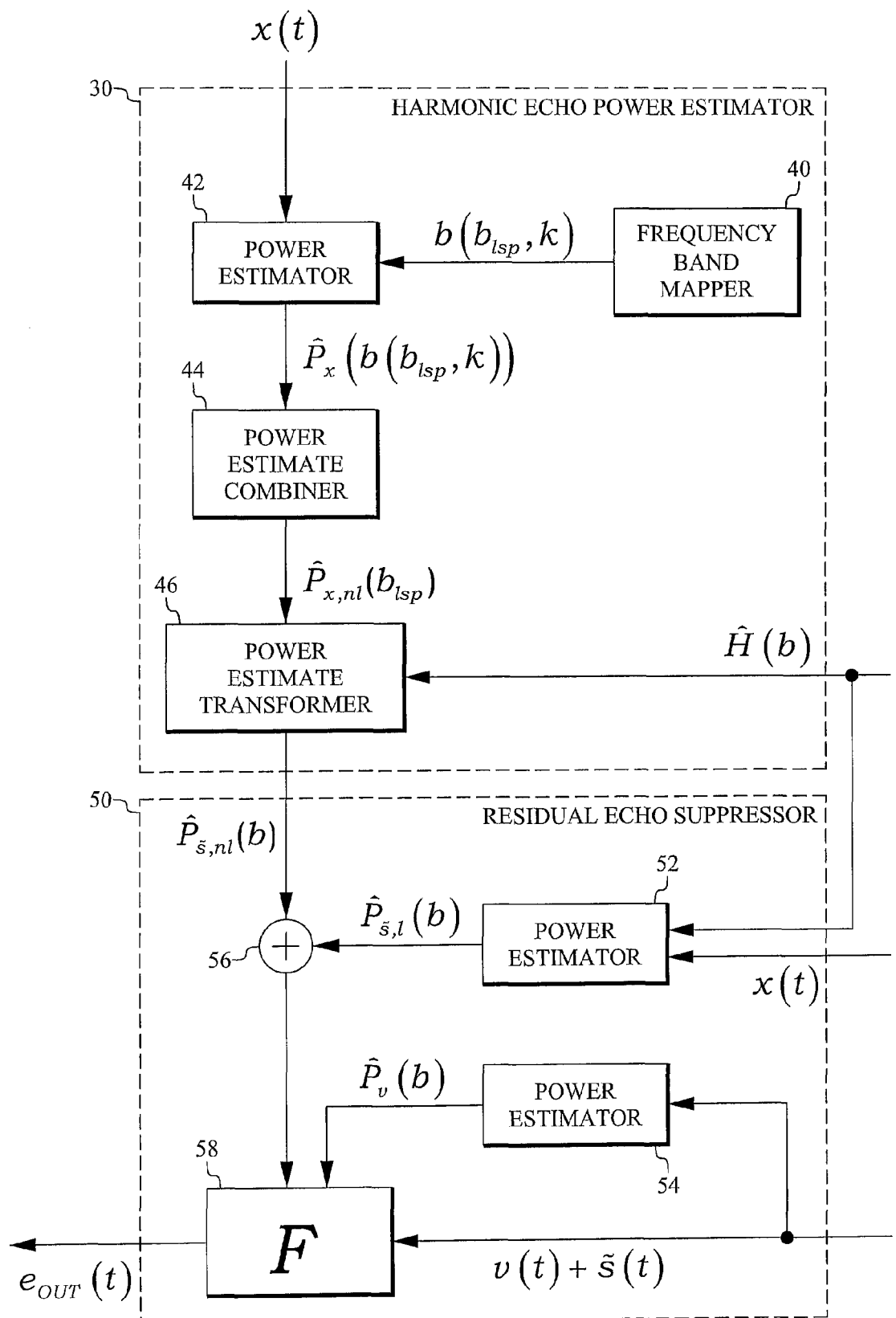
FIG. 6 is a block diagram illustrating an embodiment of an harmonic echo power estimator in accordance with the present invention.

FIG. 6 is a block diagram illustrating an embodiment of a harmonic echo power estimator 30 implementing the described method.

A frequency band mapper 40 is configured to map each frequency band in a set of loudspeaker output signal frequency bands $b_{lsp}$ into a corresponding array of loudspeaker input signal frequency bands $b(b_{lsp}, k)$, where each frequency band in the set is mapped into several frequency bands in the corresponding array. The frequency band mapper 40 may, for example, be implemented as a predetermined lookup table, such as Table 1 in APPENDIX 1.

A power estimator 42 receiving the mapped loudspeaker input signal frequency bands $b(b_{lsp}, k)$ and the loudspeaker input signal x(t) is configured to determine a power estimate $\hat{P}_x(b(k_{lsp}, k))$ of each loudspeaker input signal in each array of frequency bands.

A power estimate combiner 44 connected to the power estimator 42 is configured to combine determined power estimates $\hat{P}_x(b(b_{lsp},k))$ in each array of frequency bands into a corresponding estimate $\hat{P}_{x,nl}(b_{lsp})$ of loudspeaker input power generating harmonic loudspeaker nonlinearities, for example in accordance with equation (4). The predetermined coefficients $C(b_{lsp},k)$ may be stored in a lookup table.

A power estimate transformer 46 connected to the power estimate combiner 44 is configured to transform the estimates of loudspeaker input power across the echo path EP into power estimates $\hat{P}_{\tilde{s},nl}(b)$ of the echo generated by the harmonic loudspeaker nonlinearities. The transformation may be performed in accordance with equation (5). The estimate $\hat{H}(b)$ of the frequency response of the echo path EP may, for example, be obtained from the echo subtractor 14, as illustrated in FIG. 4.

As previously described, in one embodiment the power estimate combiner 44 may be configured to include only determined power estimates exceeding a predetermined power threshold in the combination (4).

In another embodiment the power estimate combiner 44 may be configured to include only terms exceeding a predetermined threshold in the sum (4).

The power estimates $\hat{P}_{\tilde{s},nl}(b)$ are forwarded to a residual echo suppressor 50. The residual echo suppressor 50 includes two power estimators 52 and 54. The functionality of power estimators 52 and 54 will only be described briefly below, since these elements are typically found in conventional residual echo suppressors.

The power estimator 52 receives the loudspeaker input signal x(t) and the estimate $\hat{H}(b)$ of the frequency response of the echo path EP. Using these entities it determines the power estimate $\hat{P}_{\tilde{s},l}(b)$. This estimate is forwarded to an adder 56, which adds it to the power estimates $\hat{P}_{\tilde{s},nl}(b)$ of the echo generated by the harmonic loudspeaker nonlinearities.

The power estimator 54 receives the signal $v(t)+\tilde{s}(t)$ from the echo subtractor 14 and forms a power estimate $\hat{P}_v(b)$ of the near-end signal v(t).

The output power estimates from the power estimator 54 and the adder 56 are forwarded to a frequency selective filter 58 represented by the function F in equation (3), which filter produces the output signal $e_{OUT}(t)$.

Figure 7:
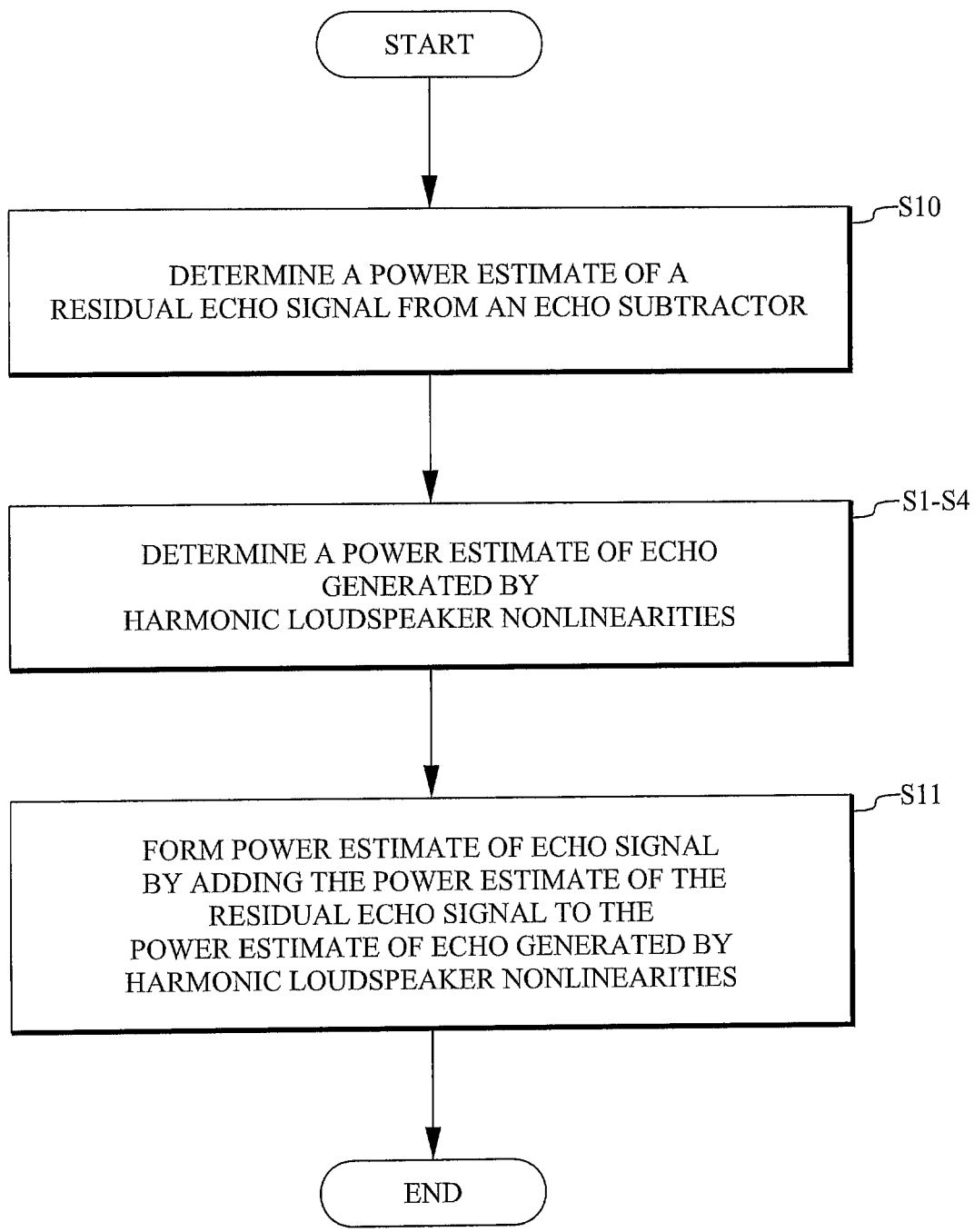
FIG. 7 is a flow chart illustrating an embodiment of an echo suppression method in accordance with the present invention.

FIG. 7 is a flow chart illustrating an embodiment of an echo suppression method in accordance with the present invention. Step S10 determines a power estimate $\hat{P}_{\tilde{s},l}(b)$ of a residual echo signal from an echo subtractor. Steps S1-S4, which are explained in more detail with reference to FIG. 5 above, determine a power estimate $\hat{P}_{\tilde{s},nl}(b)$ of echo generated by harmonic loudspeaker nonlinearities. Step S11 forms the power estimate of the echo signal by adding the power estimate $\hat{P}_{\tilde{s},l}(b)$ of the residual echo signal to the power estimate $\hat{P}_{\tilde{s},nl}(b)$ of echo generated by harmonic loudspeaker nonlinearities.

Figure 8:
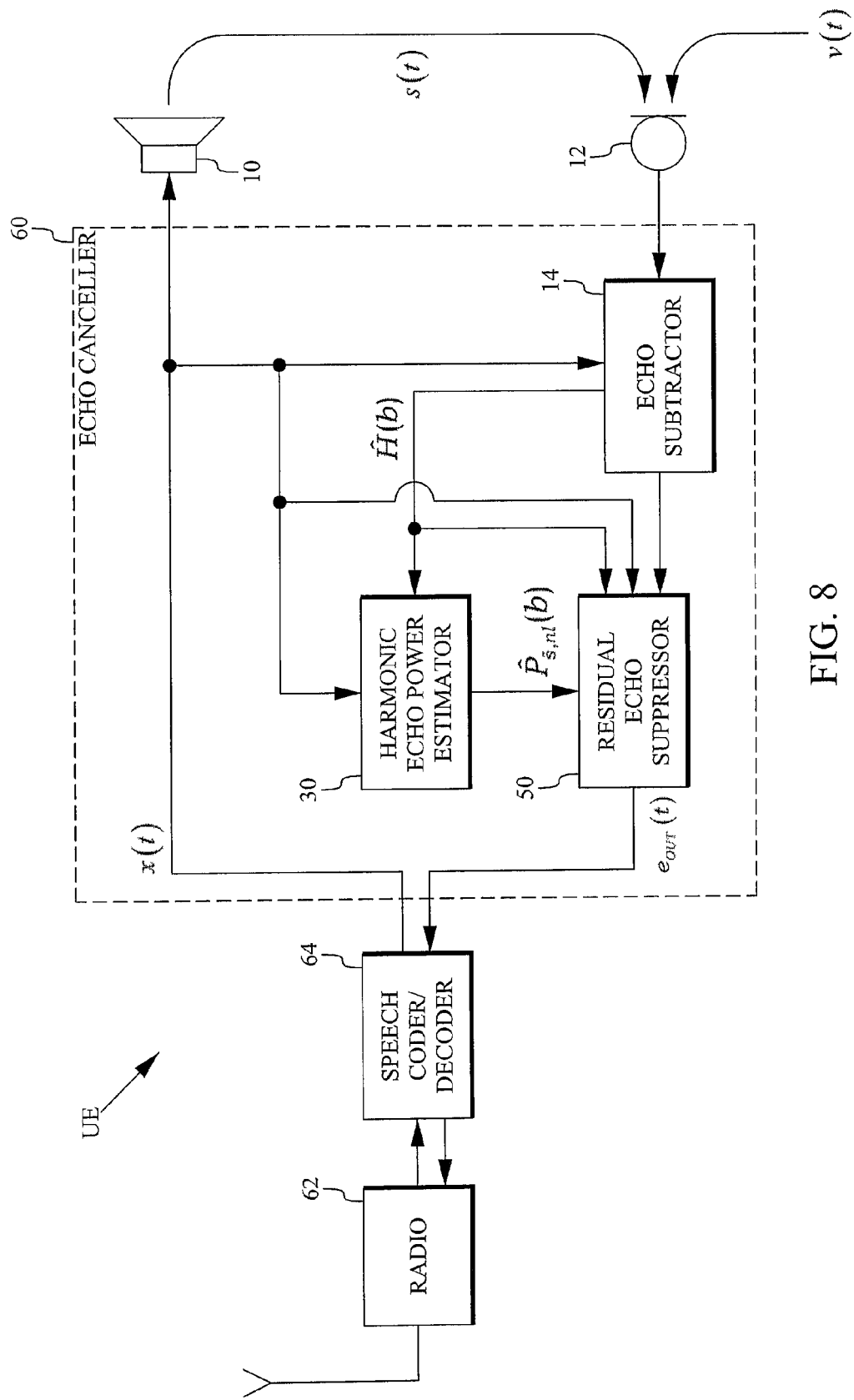
FIG. 8 is a block diagram illustrating an embodiment of a user equipment in accordance with the present invention.

FIG. 8 is a block diagram illustrating an embodiment of a user equipment in accordance with the present invention. An echo canceller 60 in accordance with the present invention is connected to an antenna over a radio 62 and a speech coder/decoder 64. The radio performs conventional up/down conversion, amplification and channel decoding. The speech coder/decoder 64 performs conventional speech coding/decoding. Since both elements 62, 64 are conventional units, they will not be described in further detail.

The steps, functions, procedures and/or blocks described herein may be implemented in hardware using any conventional technology, such as discrete circuit or integrated circuit technology, including both general-purpose electronic circuitry and application-specific circuitry.

Alternatively, at least some of the steps, functions, procedures and/or blocks described herein may be implemented in software for execution by a suitable processing device, such as a micro processor, Digital Signal Processor (DSP) and/or any suitable programmable logic device, such as a Field Programmable Gate Array (FPGA) device.

It should also be understood that it may be possible to reuse the general processing capabilities of the UE. This may, for example, be done by reprogramming of the existing software or by adding new software components.

Figure 9:
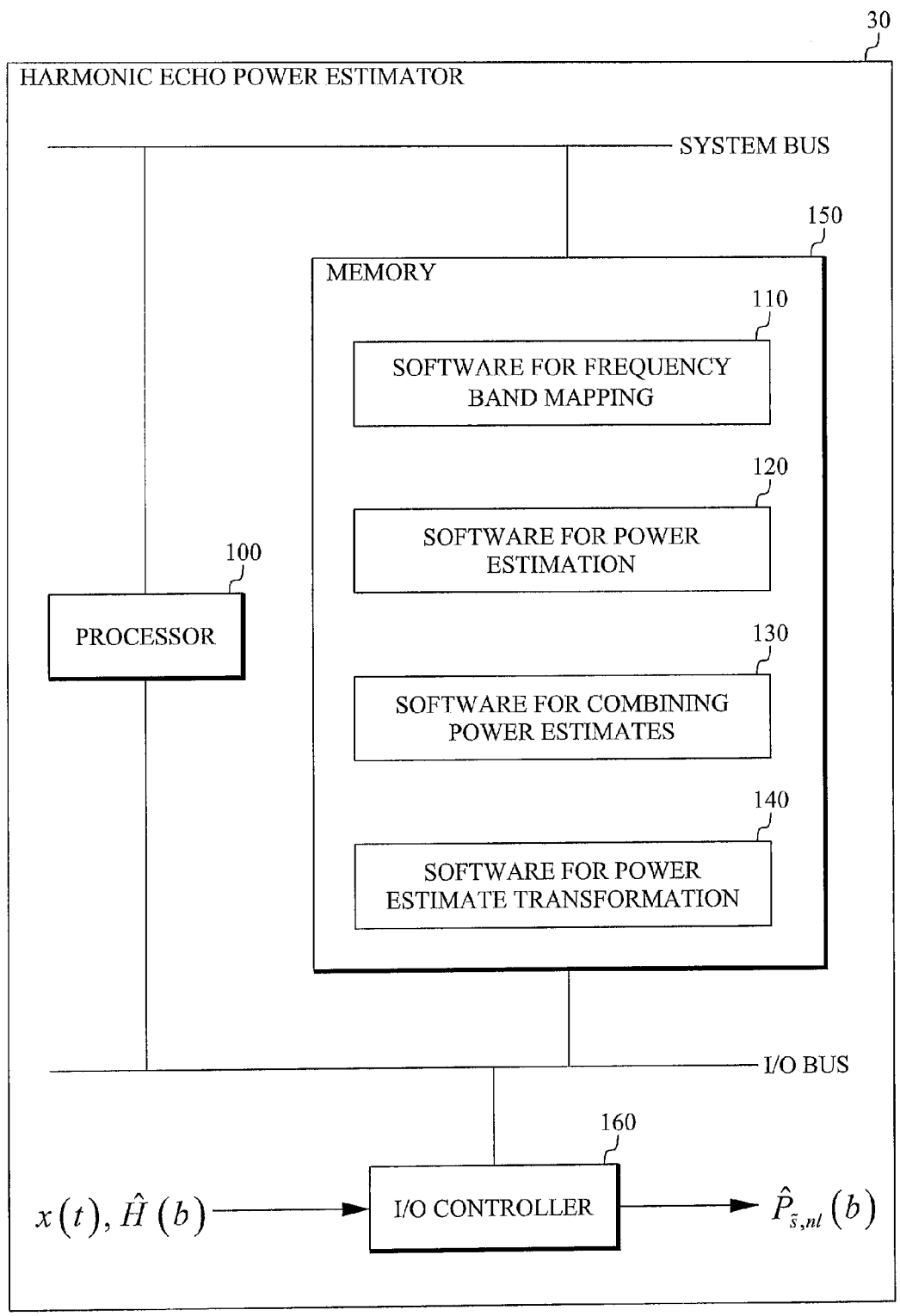
FIG. 9 is a block diagram illustrating an embodiment of a harmonic echo power estimator in accordance with the present invention.

As an implementation example, FIG. 9 is a block diagram illustrating an example embodiment of a harmonic echo power estimator 30 in accordance with the present invention.

This embodiment is based on a processor 100, for example a micro processor, which executes a software component 110 for frequency band mapping, a software component 120 for power estimation, a software component 130 for combining power estimates, and a software component 140 for power estimate transformation. These software components are stored in memory 150. The processor 100 communicates with the memory over a system bus. The loudspeaker input signal x(t) and the estimate Ĥ(b) of the frequency response of the echo path EP are received by an input/output (I/O) controller 160 controlling an I/O bus, to which the processor 100 and the memory 150 are connected. In this embodiment the parameters received by the I/O controller 160 are stored in the memory 150, where they are processed by the software components. Software component 110 may implement the functionality of block 40 in the embodiments described above. Software component 120 may implement the functionality of block 42 in the embodiments described above. Software component 130 may implement the functionality of block 44 in the embodiments described above. Software component 140 may implement the functionality of block 46 in the embodiments described above. The power estimate $\hat{P}_{s,nl}(b)$ obtained from software component 140 is outputted from the memory 150 by the I/O controller 160 over the I/O bus.

Figure 10:
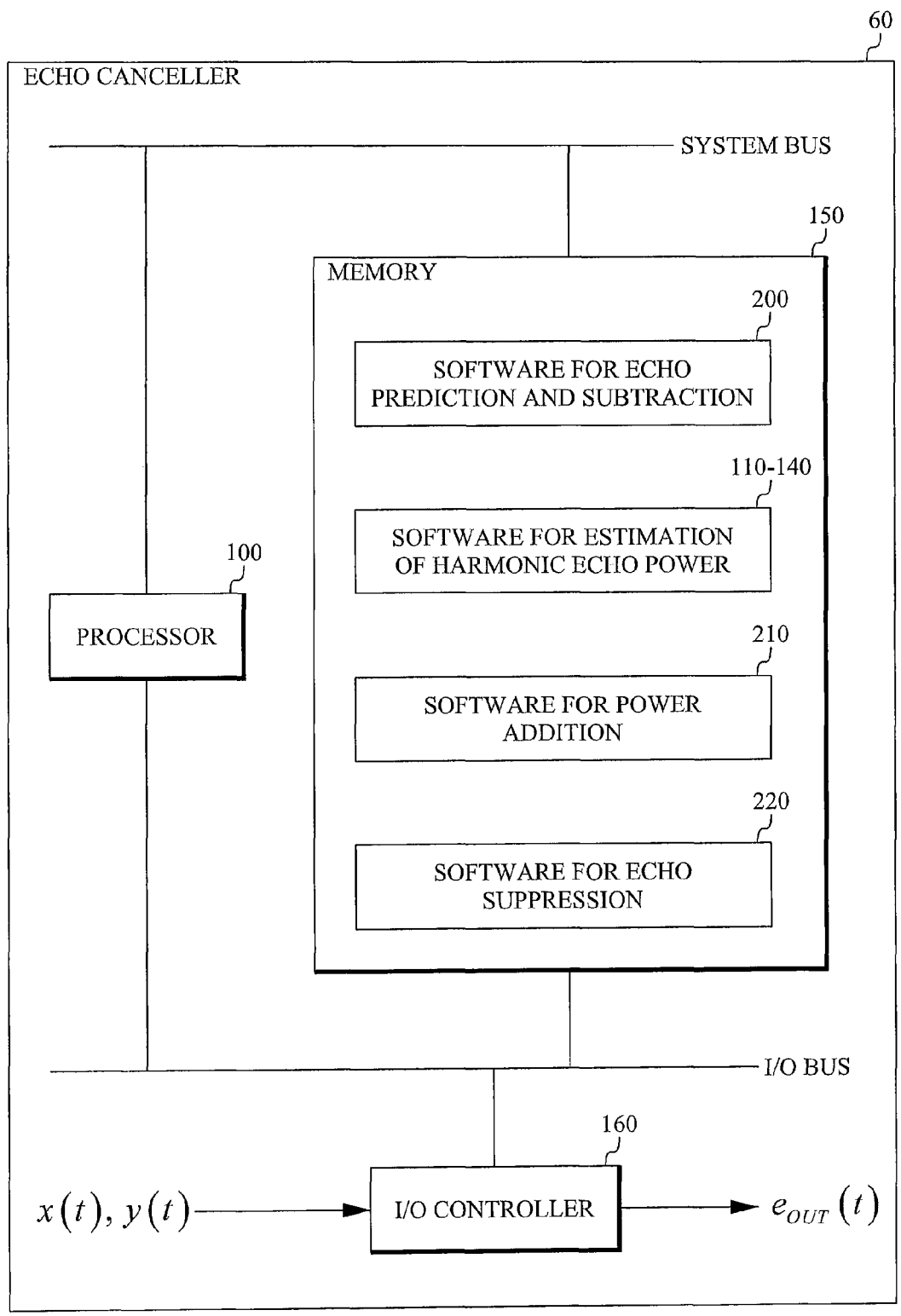
FIG. 10 is a block diagram illustrating an embodiment of an echo canceller in accordance with the present invention.

FIG. 10 is a block diagram illustrating an embodiment of an echo canceller 60 in accordance with the present invention. In addition to the software components 110-140 described with reference to FIG. 9, the memory 150 also includes a software component 200 for echo prediction and subtraction, a software component 210 for power addition, and a software component 220 for echo suppression. Software component 200 may implement the functionality of block 14 in the embodiments described above. Software component 210 may implement the functionality of block 56 in the embodiments described above. Software component 220 may implement the functionality of block 58 in the embodiments described above. The loudspeaker input signal x(t) and the microphone signal y(t) are received by the I/O controller 160 on the I/O bus, and the output signal $e_{OUT}(t)$ from the echo canceller is forwarded to the speech coder on the I/O bus. In the embodiments of FIGS. 9 and 10 other tasks, such as demodulation, channel coding/decoding and speech coding/decoding in a UE, are assumed to be handled elsewhere in the UE. However, an alternative is to let further software components in the memory 150 also handle all or part of the these tasks.

In case the UE is a computer receiving voice over Internet Protocol (IP) packets, the IP packets are typically forwarded to the I/O controller 160 and the loudspeaker input signal x(t) is extracted by further software components in the memory 150.

Non-limiting examples of typical UEs where the present invention may be used are: personal computers (stationary or notebook), netbooks, tablet PCs, mobile internet devices, smartphones, feature phones.

Some or all of the software components described above may be carried on a computer-readable medium, for example a CD, DVD or hard disk, and loaded into the memory for execution by the processor.

Since the harmonic loudspeaker nonlinearities mainly occur for narrowband type loudspeaker input signals, these kinds of signals may to be detected in order to determine when the described method for the loudspeaker nonlinearities should be used. In order to do this several types of signals may be detected, and if any of these types are present, the method is used, otherwise it is not used. Such signal types are, for example, harmonic signals and nonstationary signals.

To detect harmonic signals that include several narrowband components that may trigger the nonlinearity, the following Cepstrum-inspired detection method may be used. The periodogram $P_{\hat{P}_x}(t, k)$ of the lowest 32 bins of $\hat{P}_x(t, f)$ is computed in order to detect the presence of narrowband harmonics:

$$P_{\hat{P}_x}(t,k) = \text{Periodogram}\{\hat{P}_x(t,f), f=1, \ldots, 32\}$$

The reason for only using the lowest 32 bins for the periodogram computation is that the harmonics are usually most prominent for these bins, and including more bins would result in a less accurate estimate.

The flatness of $P_{\hat{P}_x}(t, k)$ is then estimated as the number of bins in $P_{\hat{P}_x}(t, k)$ that exceeds a threshold of $0.7 \max\{P_{\hat{P}_x}(t,k)\}$. If this number exceeds 2, then the signal is considered to include harmonics.

This detection scheme for non-stationary signals may be used to catch the onset of harmonic signals, which are sometimes missed by the technique above. These are characterized by a change in the signal statistics and are detected as non-stationarities in the signal. The detection technique detects nonstationarities as a significant deviation from the average power and is performed as follows:

$$\text{Decision} = \begin{cases} \text{stationary}, & \text{if } 0.71 P_x^{avg}(t) < P_x(t) < 1.41 P_x^{avg}(t) \\ \text{non-stationary}, & \text{otherwise} \end{cases}$$

$$P_x(t) = \frac{1}{L} \sum_{k=0}^{L-1} x^2(t)$$

$$P_x^{avg}(t) = \frac{15}{16} P_x^{avg}(t) + \frac{1}{16} P_x(t)$$

It will be understood by those skilled in the art that various modifications and changes may be made to the present invention without departure from the scope thereof, which is defined by the appended claims.

APPENDIX 1

Since an overtone has to be an integer multiple of the fundamental frequency, overtones in a certain loudspeaker output band will originate from an array of loudspeaker input bands. Table 1 below is an example mapping based on an equidistant bandwidth of 250 Hz for each frequency band.

TABLE 1

| Band | \multicolumn{9}{c}{Overtone} | | | | | | | | |
|---|---|---|---|---|---|---|---|---|---|
| | 1 | 2 | 3 | 4 | 5 | 6 | 7 | 8 | 9 |
| 1 | 1 | 1 | 1 | 1 | 1 | 1 | 1 | 1 | 1 |
| 2 | 1 | 1 | 1 | 1 | 1 | 1 | 1 | 1 | 1 |
| 3 | 2 | 1 | 1 | 1 | 1 | 1 | 1 | 1 | 1 |
| 4 | 2 | 2 | 1 | 1 | 1 | 1 | 1 | 1 | 1 |
| 5 | 3 | 2 | 2 | 1 | 1 | 1 | 1 | 1 | 1 |
| 6 | 3 | 2 | 2 | 2 | 1 | 1 | 1 | 1 | 1 |
| 7 | 4 | 3 | 2 | 2 | 2 | 1 | 1 | 1 | 1 |
| 8 | 4 | 3 | 2 | 2 | 2 | 2 | 1 | 1 | 1 |
| 9 | 5 | 3 | 3 | 2 | 2 | 2 | 2 | 1 | 1 |
| 10 | 5 | 4 | 3 | 2 | 2 | 2 | 2 | 2 | 1 |
| 11 | 6 | 4 | 3 | 3 | 2 | 2 | 2 | 2 | 2 |
| 12 | 6 | 4 | 3 | 3 | 2 | 2 | 2 | 2 | 2 |
| 13 | 7 | 5 | 4 | 3 | 3 | 2 | 2 | 2 | 2 |
| 14 | 7 | 5 | 4 | 3 | 3 | 2 | 2 | 2 | 2 |
| 15 | 8 | 5 | 4 | 3 | 3 | 3 | 2 | 2 | 2 |
| 16 | 8 | 6 | 4 | 4 | 3 | 3 | 2 | 2 | 2 |
| 17 | 9 | 6 | 5 | 4 | 3 | 3 | 3 | 2 | 2 |

TABLE 1-continued

| Band | Overtone | | | | | | | | |
|---|---|---|---|---|---|---|---|---|---|
| | 1 | 2 | 3 | 4 | 5 | 6 | 7 | 8 | 9 |
| 18 | 9 | 6 | 5 | 4 | 3 | 3 | 3 | 2 | 2 |
| 19 | 10 | 7 | 5 | 4 | 4 | 3 | 3 | 3 | 2 |
| 20 | 10 | 7 | 5 | 4 | 4 | 3 | 3 | 3 | 2 |
| 21 | 11 | 7 | 6 | 5 | 4 | 3 | 3 | 3 | 3 |
| 22 | 11 | 8 | 6 | 5 | 4 | 4 | 3 | 3 | 3 |
| 23 | 12 | 8 | 6 | 5 | 4 | 4 | 3 | 3 | 3 |
| 24 | 12 | 8 | 6 | 5 | 4 | 4 | 3 | 3 | 3 |
| 25 | 13 | 9 | 7 | 5 | 5 | 4 | 4 | 3 | 3 |
| 26 | 13 | 9 | 7 | 6 | 5 | 4 | 4 | 3 | 3 |
| 27 | 14 | 9 | 7 | 6 | 5 | 4 | 4 | 3 | 3 |
| 28 | 14 | 10 | 7 | 6 | 5 | 4 | 4 | 4 | 3 |
| 29 | 15 | 10 | 8 | 6 | 5 | 5 | 4 | 4 | 3 |
| 30 | 15 | 10 | 8 | 6 | 5 | 5 | 4 | 4 | 3 |
| 31 | 16 | 11 | 8 | 7 | 6 | 5 | 4 | 4 | 4 |
| 32 | 16 | 11 | 8 | 7 | 6 | 5 | 4 | 4 | 4 |

As a further example, the following MATLAB® code may be used to determine a similar mapping with a sampling frequency of 48 kHz a band structure using 250 Hz/band and 6 overtones:

f0=0:250:(24000−250); f0=f0';
f1=249:250:(24000); f1=f1';
M=1+[floor(f0/2/250) floor (f1/2/250) floor(f0/3/250) floor(f1/3/250) floor(f0/4/250) floor(f1/4/250), . . . floor(f0/5/250) floor(f1/5/250) floor(f0/6/250) floor(f1/6/250) floor (f0/7/250) floor(f1/7/250)];
M=M(:, 1:2:end);

APPENDIX 2

The harmonic nonlinearities in the loudspeaker are modeled via the relative amplitude of the harmonics (relative the fundamental), denoted $\{h_k\}$, and a gain factor $\gamma_n$ that describes the strength of the nonlinearities produced by a certain frequency.

An estimated spectrum of the nonlinearities is computed from the spectrum of the loudspeaker output signal as:

$$P_X^{Harmonic}(f) = \sum_{n=1}^{N_{BANDS}} A_n \cdot \gamma_n \cdot P_X(f_n)$$

where the vectors $\{A_n\}$ are determined from $\{h_k\}$ according to the spread of the overtones (the frequency mapping is described in APPENDIX 1):

$f_1$, [0-250[ : $h_1(f_1) + \ldots + h_k(f_1)$
$f_2$, [250-500[ : $h_1(f_1) + \ldots + h_k(f_1)$
$f_3$, [500-750[ : $h_1(f_2) + h_2(f_1) + \ldots + h_k(f_1)$
$f_4$, [750-1000[ : $h_1(f_2) + h_2(f_2) + h_3(f_1) + h_4(f_1) + \ldots + h_k(f_1)$
$f_5$, [1000-1250[ : $h_1(f_3) + h_2(f_2) + h_3(f_2) + h_4(f_1) + h_5(f_1) + \ldots + h_k(f_1)$
$f_6$, [1250-1500[ : $h_1(f_3) + h_2(f_2) + h_3(f_2) + h_4(f_2) + h_5(f_2) + h_6(f_1) + \ldots + h_k(f_1)$
$f_7$, [1500-1750[ : $h_1(f_4) + h_2(f_3) + h_3(f_2) + h_4(f_2) + h_5(f_2) + h_6(f_1) + \ldots + h_k(f_1)$
$f_8$, [1750-2000[ : $h_1(f_4) + h_2(f_3) + h_3(f_2) + h_4(f_2) + h_5(f_2) + h_6(f_2) + h_7(f_1) + \ldots + h_k(f_1)$ $\vdots$ Hence:

$$A_1 = \begin{bmatrix} \alpha_{1,1} \\ \vdots \\ \alpha_{1,N_{BANDS}} \end{bmatrix} = \begin{bmatrix} h_1 + h_2 + \ldots + h_k \\ h_1 + h_2 + \ldots + h_k \\ h_2 + \ldots + h_k \\ \vdots \end{bmatrix},$$

$$A_2 = \begin{bmatrix} \alpha_{2,1} \\ \vdots \\ \alpha_{2,N_{BANDS}} \end{bmatrix} = \begin{bmatrix} 0 \\ 0 \\ h_1 \\ h_1 + h_2 \\ h_2 + h_3 \\ \vdots \end{bmatrix}, \ldots$$

The relative amplitude $\{h_k\}$ of the harmonics and the fundamental gain factors $\gamma_n$ should be selected in accordance with the non-linearity produced by the loudspeaker.

The coefficients $C(b_{lsp}, k)$ in equation (4) are formed by products of these parameters.

ABBREVIATIONS

DSP Digital Signal Processor
FFT Fast Fourier Transform
FPGA Field Programmable Gate Array
I/O Input/Output
IP Internet Protocol
UE User Equipment

REFERENCES

[1] A. Stenger, R. Rabenstein, "ADAPTIVE VOLTERRA FILTERS FOR NONLINEAR ACOUSTIC ECHO CANCELLATION", http://www.ee.bilkent.edu.tr/~signal/Nsip99/papers/146.pdf
[2] G. Budura, C. Botoca, "Nonlinearities Identification using The LMS Volterra Filter", http://hermes.etc.upt.ro/docs/cercetare/articole/BudBot05.pdf
[3] Hongyun Dai, Wei-Ping Zhul, "Compensation of Loudspeaker Nonlinearity in Acoustic Echo Cancellation Using Raised-Cosine Function", EEE TRANSACTIONS ON CIRCUITS AND SYSTEMS—II: EXPRESS BRIEFS, VOL. 53, NO. 11, NOVEMBER 2006
[4] H. Schurer, C. H. Slump, O. E. Herrmann, "Second Order Volterra Inverses for Compensation of Loudspeaker Nonlinearity", November 2009, http://doc.utwente.nl/17422/1/00482982.pdf

The invention claimed is:
1. A method of estimating power of echo generated by harmonic loudspeaker nonlinearities in a user equipment having an echo path between a loudspeaker input and a microphone output, said method comprising the steps of:
    performing operations as follows on an echo canceller processor:
    mapping each frequency band in a set of loudspeaker output signal frequency bands ($b_{lsp}$) into a corresponding array of loudspeaker input signal frequency bands

(b($b_{lsp}$, k)), each frequency band in the set being mapped into several frequency bands in the corresponding array;

determining a power estimate ($\hat{P}_x(b(b_{lsp}, k))$) of each input signal in each array of frequency bands;

combining determined power estimates ($\hat{P}_x(b(b_{lsp}, k))$) in each array of frequency bands into a corresponding estimate ($\hat{P}_{x,nl}(b_{lsp})$) of loudspeaker input power generating harmonic loudspeaker nonlinearities;

transforming the estimates ($\hat{P}_{x,nl}(b_{lsp})$) of loudspeaker input power across the echo path (EP) into power estimates ($\hat{P}_{x,nl}(b)$) of the echo generated by the harmonic loudspeaker nonlinearities; and canceling echo in a microphone signal from the microphone responsive to the power estimates ($\hat{P}_{\tilde{s},nl}(b)$) of the echo generated by the harmonic loudspeaker nonlinearities, to generate an echo canceled microphone signal.

2. The method of claim 1, wherein the combining step is based on the combination:

$$\hat{P}_{x,nl}(b_{lsp}) = \sum_{k=1}^{N_O} C(b_{lsp}, k) \cdot \hat{P}_x(b(b_{lsp}, k))$$

where
$\hat{P}_{x,nl}(b_{lsp})$ denotes the estimate of loudspeaker input power in loudspeaker output signal frequency band $b_{lsp}$,
b($b_{lsp}$, k) denotes the mapping,
$\hat{P}_x(b(b_{lsp}, k))$ denotes determined power estimates in loudspeaker input signal frequency bands b($b_{lsp}$, k),
C($b_{lsp}$, k) denotes predetermined coefficients,
$N_O$ denotes a maximum number of terms to be included in each combination.

3. The method of claim 2, further comprising only including terms exceeding a predetermined threshold in the sum of the combining step.

4. The method of claim 1, further comprising including only determined power estimates exceeding a predetermined power threshold in the combining step.

5. The method of claim 1, wherein the transforming step multiplies the estimates of loudspeaker input power with the squared magnitude of an estimate ($\hat{H}(b)$) of the frequency response of the echo path (EP).

6. The method of claim 1, further comprising:
transmitting a radio signal through radio circuitry and an antenna based on the echo canceled microphone signal.

7. The method of claim 6, further comprising:
coding the echo canceled microphone signal by a speech coder to generate a coded signal,
wherein the transmitting a radio signal through radio circuitry and an antenna based on the echo canceled microphone signal, comprises transmitting the radio signal based on the coded signal.

8. An echo suppression method using a frequency selective filter based on the ratio between a power estimate of a near-end signal and a power estimate of an echo signal, comprising the steps of:
determining a power estimate ($\hat{P}_{\tilde{s},l}(b)$) of a residual echo signal from an echo subtractor;
determining, in accordance with claim 1, a power estimate ($\hat{P}_{\tilde{s},nl}(b)$) of echo generated by harmonic loudspeaker nonlinearities; and
forming the power estimate of the echo signal by adding the power estimate ($\hat{P}_{\tilde{s},l}(b)$) of the residual echo signal to the power estimate ($\hat{P}_{\tilde{s},nl}(b)$) of echo generated by harmonic loudspeaker nonlinearities.

9. A harmonic echo power estimator configured to estimate power of echo generated by harmonic loudspeaker nonlinearities in a user equipment having an echo path between a loudspeaker input and a microphone output, said harmonic echo power estimator comprising:
an echo canceller processor; and
a memory connected to the echo canceller processor, the memory storing program instruction executed by the echo canceller processor to:
map each frequency band in a set of loudspeaker output signal frequency bands ($b_{lsp}$) into a corresponding array of loudspeaker input signal frequency bands (b($b_{lsp}$, k)), each frequency band in the set being mapped into several frequency bands in the corresponding array;
determine a power estimate ($\hat{P}_x(b(b_{lsp}, k))$) of each loudspeaker input signal in each array of frequency bands;
combine determined power estimates ($\hat{P}_x(b(b_{lsp}, k))$) in each array of frequency bands into a corresponding estimate ($\hat{P}_{x,nl}(b_{lsp}, k)$) of loudspeaker input power generating harmonic loudspeaker nonlinearities;
transform the estimates of loudspeaker input power across the echo path (EP) into power estimates ($\hat{P}_{\tilde{s},nl}(b)$) of the echo generated by the harmonic loudspeaker nonlinearities; and
cancel echo in a microphone signal from the microphone responsive to the power estimates ($\hat{P}_{\tilde{s},nl}(b)$) of the echo generated by the harmonic loudspeaker nonlinearities, to generate an echo canceled microphone signal.

10. The harmonic echo power estimator of claim 9, wherein the echo canceller processor is further configured by the program instructions to combine the determined power estimates based on $$\hat{P}_{x,nl}(b_{lsp}) = \sum_{k=1}^{N_O} C(b_{lsp}, k) \cdot \hat{P}_x(b(b_{lsp}, k))$$

where
$\hat{P}_{\tilde{s},nl}(b_{lsp})$ denotes the estimate of loudspeaker input power in loudspeaker output signal frequency band $b_{lsp}$,
b($b_{lsp}$, k) denotes the mapping,
$\hat{P}_x(b(b_{lsp}, k))$ denotes determined power estimates in loudspeaker input signal frequency bands b($b_{lsp}$, k),
C($b_{lsp}$, k) denotes predetermined coefficients,
$N_O$ denotes a maximum number of terms to be included in the combination.

11. The harmonic echo power estimator of claim 10, wherein the echo canceller processor is further configured by the program instructions to include only terms exceeding a predetermined threshold in the sum when combining the determined power estimates.

12. The harmonic echo power estimator of claim 9, wherein the echo canceller processor is further configured by the program instructions to include only determined power estimates exceeding a predetermined power threshold in the combination.

13. The harmonic echo power estimator of claim 9, wherein the echo canceller processor is further configured by the program instructions to transform the estimates of loudspeaker input power based on multiplying the estimates of loudspeaker input power with the squared magnitude of an estimate ($\hat{H}(b)$) of the frequency response of the echo path.

14. The harmonic echo power estimator of claim 9, further comprising:

radio circuitry that transmits a radio signal through an antenna based on the echo canceled microphone signal.

15. The harmonic echo power estimator of claim 14, further comprising:
a speech coder that codes the echo canceled microphone signal to generate a coded signal,
wherein the radio circuitry transmits the radio signal based on the echo canceled microphone signal.

16. An echo canceller having a residual echo suppressor using a frequency selective filter based on the ratio between a power estimate of a near-end signal and a power estimate of an echo signal, said echo canceller comprising:
an echo canceller processor; and
a memory connected to the echo canceller processor, the memory storing program instruction executed by the echo canceller processor to:
determine a power estimate ($\hat{P}_{\tilde{s},l}(b)$) of a residual echo signal from an echo subtractor;
determine in accordance with claim 9 a power estimate ($\hat{P}_{\tilde{s},nl}(b)$) of echo generated by harmonic loudspeaker nonlinearities; and
add the power estimate ($\hat{P}_{\tilde{s},l}(b)$) of the residual echo signal to the power estimate ($\hat{P}_{\tilde{s},nl}(b)$) of echo generated by harmonic loudspeaker nonlinearities.

17. A user equipment including an echo canceller in accordance with claim 16.

* * * * *